United States Patent [19]

Bergquist et al.

[11] 4,025,131

[45] May 24, 1977

[54] REMOVABLE SANITARY HANGER BEARING

[75] Inventors: Dwight H. Bergquist, Omaha, Nebr.; Gary D. Lorimor, Council Bluffs, Iowa

[73] Assignee: Henningsen Foods, Inc., White Plains, N.Y.

[22] Filed: Jan. 8, 1976

[21] Appl. No.: 647,415

[52] U.S. Cl. .................................. 308/27; 308/62
[51] Int. Cl.² ........................................ F16C 33/04
[58] Field of Search ........................... 308/27–34, 308/62, 237 R

[56] References Cited

UNITED STATES PATENTS

| | | | |
|---|---|---|---|
| 3,351,395 | 11/1967 | Stone | 308/27 |
| 3,383,142 | 5/1968 | Scott | 308/27 X |
| 3,820,860 | 6/1974 | Stone | 308/27 |

Primary Examiner—Joseph F. Peters, Jr.
Assistant Examiner—Gene A. Church
Attorney, Agent, or Firm—Holland, Armstrong, Wilkie & Previto

[57] ABSTRACT

An improved bearing is described for supporting shafts, for example, the shafts used for screw conveyors in sanitary food processing apparatus. The hanger bearings may be installed and removed and the supported shafts may be removed from the bearings without uncoupling the shafts or removing the driven elements from the shafts. For this reason, the bearings are particularly useful with unitary welded assemblies such as sanitary screw conveyors. The bearing is of sanitary design and incorporates a split, non-binding, low friction bearing element.

5 Claims, 4 Drawing Figures

REMOVABLE SANITARY HANGER BEARING

BACKGROUND OF THE INVENTION

The present invention relates to improved removable hanger bearings and more particularly to bearings which may be installed and removed with the supported shaft in place and from which the shaft may also be removed without being uncoupled from its driving or driven elements.

In screw conveyor systems incorporating several screw sections connected in series, for example, the screw sections are connected and driven by interconnected support shafts. These shafts are often supported on hanger bearings. In sanitary screw conveyor systems, in particular, the shaft sections are welded together and are welded to the screw members. The present hanger bearing design permits the welded shafts as well as the bearing elements to be removed for cleaning, inspection, and replacement.

Accordingly an object of the present invention is to provide an improved sanitary hanger bearing.

Another object of the present invention is to provide a hanger bearing which may be disassembled with the shaft in place.

Another object of the present invention is to provide a non-binding hanger bearing.

Another object of the present invention is to provide a hanger bearing from which the shaft may be removed while coupled to its driving and driven members.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing, forming a part of the specification, wherein.

DESCRIPTION OF THE PREFERRED EMBODIMENT

The improved hanger bearing may be used for supporting a variety of shaft mounted elements and will be clear from the following description of it. The bearing, however, is particularly useful in mounting elements such as screw conveyors as used in food processing machinery in view of its self-cleaning action while in use and in view of its easy disassembly and simplified structure which permits necessary sanitizing operations between runs. A preferred embodiment of the improved bearing will be described in a structure where a screw conveyor is rotatably supported in an elongated trough for moving powdered or particulate food products, such as powdered eggs or milk or other foods.

Figure 1:
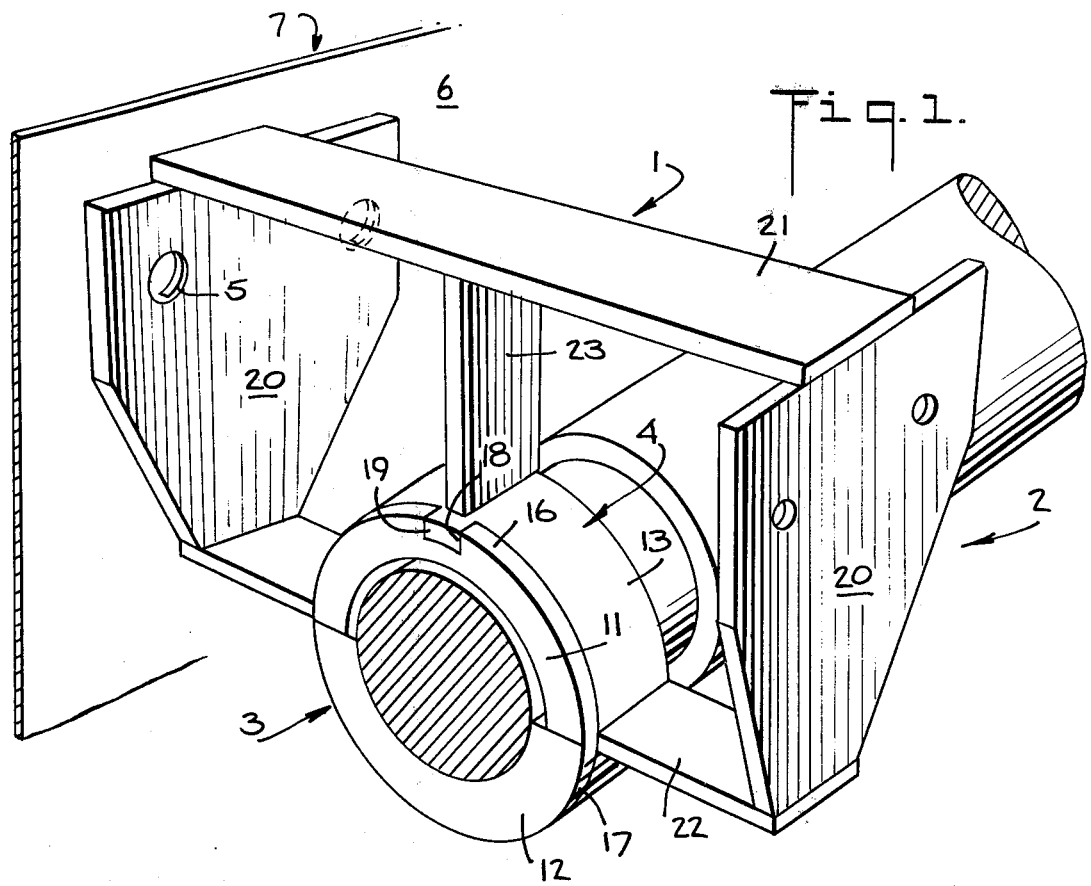
FIG. 1 is a perspective view, partially cut away, of a preferred embodiment of the invention.

FIG. 1 shows a hanger bearing 1 including a frame-like support structure 2 and a central removable bearing element 3 mounted on a generally circular bearing housing 4. The hanger bearing 1 is mounted by fasteners 5 on the side walls 6 of the product trough 7 for supporting a shaft 8 within the trough 7 permitting the screw elements of a screw conveyor (not shown) or other elements to be supported and driven by the shaft 8.

Figure 4:
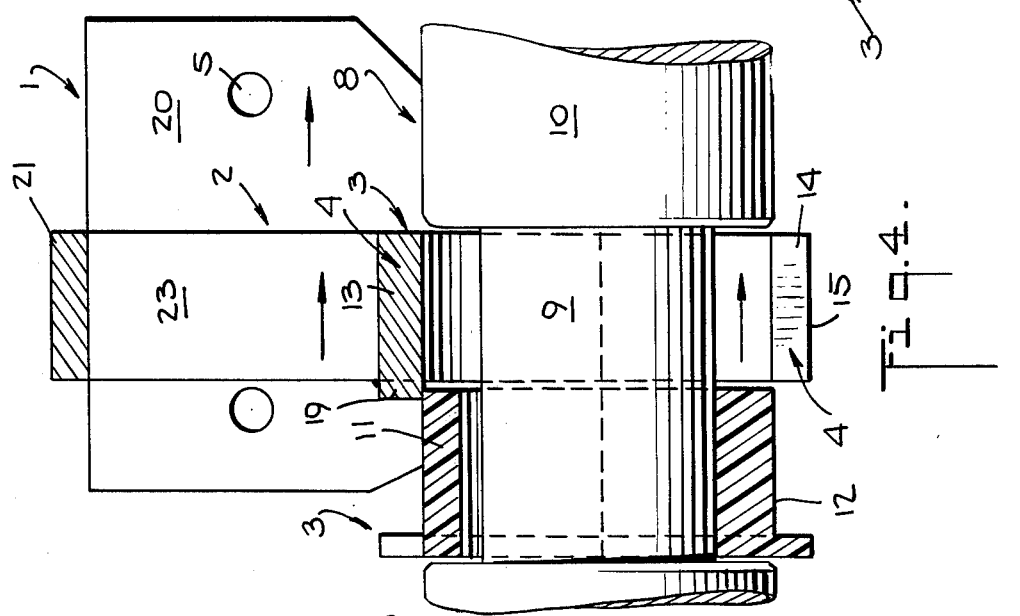
FIG. 4 is a vertical sectional view corresponding to FIG. 3 but with the bearing and the support bracket separated for removal.

As illustrated, the hanger bearing 1 is particularly suited for providing an intermediate support for a bearing portion 9 of the shaft 8 between operating portions 10, as best illustrated in FIG. 4.

Figure 2:
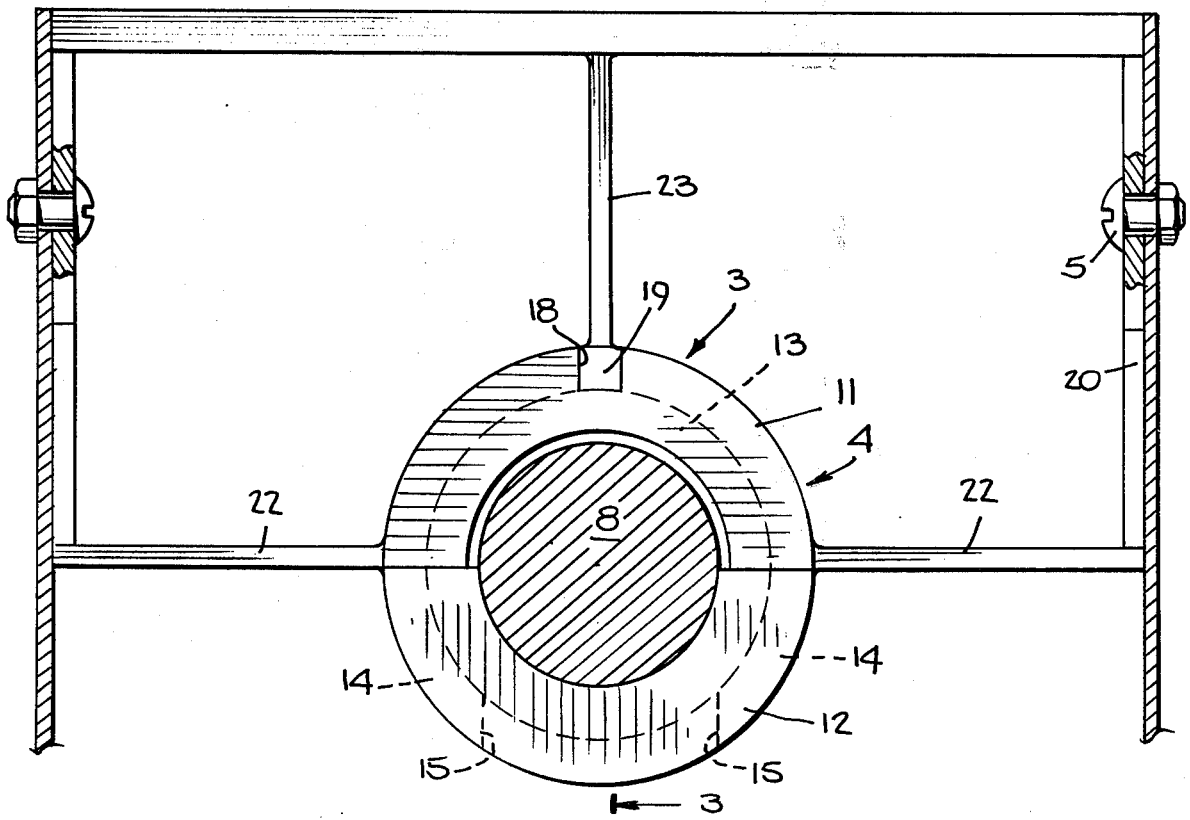
FIG. 2 is a front elevational view partially in section of a preferred embodiment of the invention.
Figure 3:
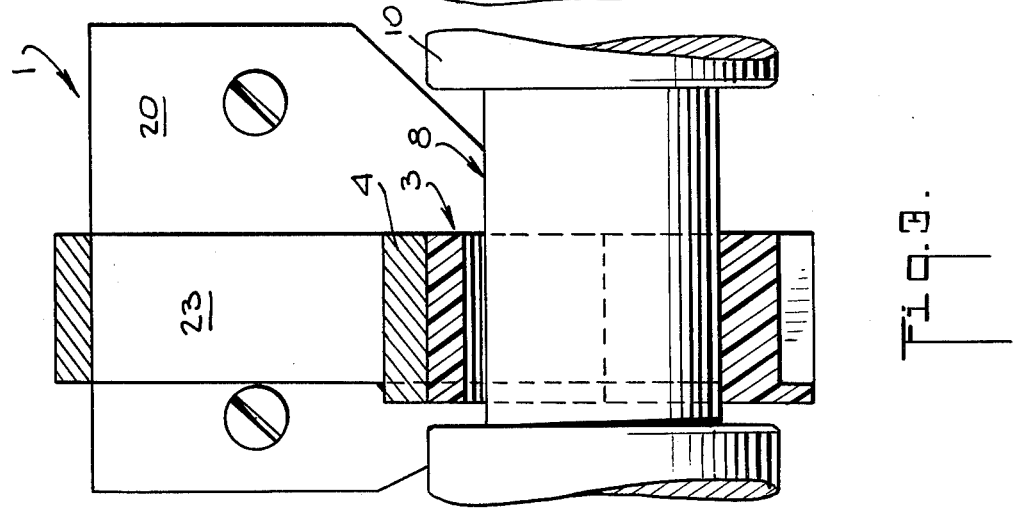
FIG. 3 is a vertical sectional view taken along line 3—3 on FIG. 2 and illustrating the screw conveyor.

The bearing element 3 comprises generally semicircular upper and lower portions 11 and 12 (FIGS. 1 and 3) which are removably mounted within the arcuate bearing housing 4 formed of stainless steel or another suitable metal preferably corrosion resistant and inert with respect to the ambient atmosphere and the materials being processed. The support housing 4 has a semicircular upper portion 13 and depending arcuate lower portions 14 which terminate at opposite edges of a slot 15 within the housing 4. The upper and lower bearing element portions 11 and 12 are proportioned so that their outer rounded surfaces closely engage the complementary inner surfaces of the housing 4. Radially outwardly extending flanges 16 and 17 on the upper and lower bearing element portions 11 and 12 act as stops to position the portions 11 and 12 in their fully inserted position within the housing 4. A slot 18 in the flange 16 for the upper portion 11 engages a complementary key 19 on the upper portion 13 of the metal housing 4. The inner semi-cylindrical surface of the lower bearing portion 12 is proportioned to slidably engage the lower surface of the rotating shaft 8. The inner semi-cylindrical surface of the upper bearing portion 11 is proportioned to be spaced outwardly from the shaft 8 surface to provide a self-cleaning action further described below. The weight of the shaft 8 together with that of its operating elements, such as the screw conveyors, maintains the shaft 8 in position on the lower bearing portion 12 as illustrated in FIGS. 1 and 2.

The preferred mounting for the bearing 1 and its housing 4 comprises a number of support arms welded or otherwise affixed to said plates 20 and to the metal bearing housing 4. These include top and bottom support arms 21 and 22 extending between the spaced side plates 20. A generally vertical support arm 23 is preferably fastened between the top of the bearing housing 4 and the top arm 21. The support plates 20 together with the arms 21, 22 and 23 are preferably proportioned to have a cross-section which is relatively thin in the direction of the product flow, i.e. in an axial direction of the shaft 8 so that the bearing 1 causes substantially no interference in product flow.

Figure 5:
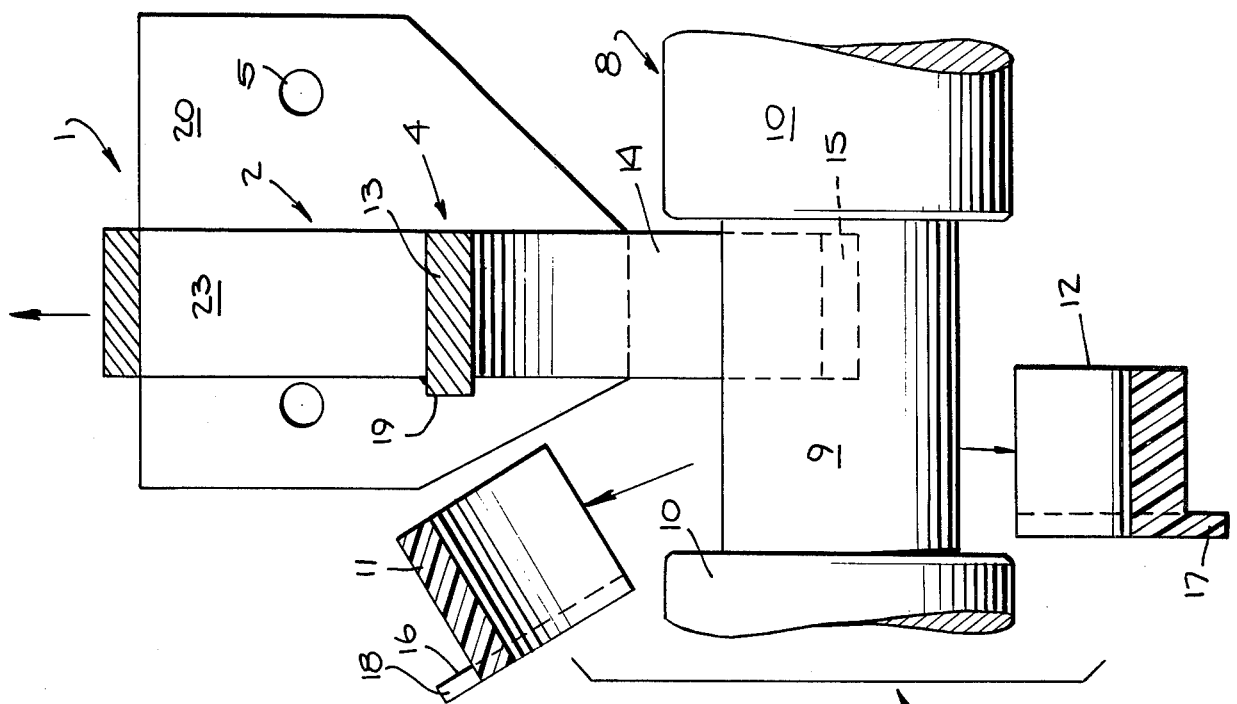

FIGS. 4 and 5 illustrate how the structure of the improved bearing facilitates removal of the bearing elements from the assembly for cleaning or replacement as well as how the shaft itself may be removed from the bearing for inspection, cleaning, or replacement within disassembly of the shaft.

The bearing element portions 11 and 12 may be readily removed as the hanger bearing 1 is detached and slid lengthwise of the shaft 8 to the position illustrated in FIG. 4. Simultaneously, or thereafter, the upper and lower portion 11 and 12 of the bearing element are slid forward on the shaft 8 to the position illustrated in FIG. 4. After the bearing portions 11 and 12 have been moved free of the housing 4 they may be carried clear of the shaft 8 in the manner illustrated in FIG. 5.

As soon as the lower bearing portion 12 has been moved clear of the metal supporting housing 4, the shaft 8 may be lowered through the slot 15 in the lower portion of the housing 4. It is therefore clear that the bearing 1 together with the bearing elements 11 and 12 may be freed from the shaft 8 in the manner described above without any axial or other adjustments or disconnections being required for the shaft or for the elements supported on the shaft.

The above described bearing element portions 11 and 12 are preferably formed of a low friction material such as nylon or other known low friction bearing materials capable of being formed in the shape described.

It will be seen that an improved bearing has been disclosed which is self-cleaning and which is particularly useful for bearings which must be periodically dismantled for cleaning or sanitizing. The novel and simple structure of the bearing adapts it for this purpose and use and provides a bearing which is of particular use in supporting the shaft driven elements of food processing machines including conveyors where these features are of great importance.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An improved hanger bearing for supporting a drive shaft having a bearing portion of reduced diameter comprising the combination of:
   a bearing housing;
   support members coupled to said housing and adapted for releasably mounting the housing on a supporting structure for movement axially of the shaft;
   a bearing element for said shaft removably positioned within said housing;
   said bearing element comprising upper and lower removable sections;
   said lower bearing element section having a semi-circular cylindrical inner shaft engaging surface terminating in shaft wiping corner portions;
   said upper removable section having a semicircular cylindrical shaft facing surface spaced radially outwardly from the shaft surface;
   radially extending flanges on said bearing sections engaging radially extending end surfaces on said bearing housing; and
   key means coupling said bearing element to said bearing housing preventing relative rotation.

2. A bearing as claimed in claim 1 in which said bearing sections comprise nylon.

3. A bearing as claimed in claim 1 in which said bearing sections comprise a low friction material.

4. A bearing as claimed in claim 1 which further comprises said support members for said housing comprising a plurality of support arms having elongated relatively thin cross-sections.

5. A bearing as claimed in claim 4 in which said support members have their longer cross-sections positioned to be generally parallel with the axis of the supported shaft.

* * * * *